US008695366B2

(12) United States Patent
Byun

(10) Patent No.: US 8,695,366 B2
(45) Date of Patent: Apr. 15, 2014

(54) APPARATUS AND METHOD FOR PRODUCING AND STORING MORE ICE OVER OCEAN

(75) Inventor: Hi Ryong Byun, Busan (KR)

(73) Assignee: Pukyong National University Industry—University Cooperation Foundation, Busan (KR)

( * ) Notice: Subject to any disclaimer, the term of this patent is extended or adjusted under 35 U.S.C. 154(b) by 1037 days.

(21) Appl. No.: 12/704,956

(22) Filed: Feb. 12, 2010

(65) Prior Publication Data

US 2011/0030394 A1 Feb. 10, 2011

(30) Foreign Application Priority Data

Aug. 6, 2009 (KR) .................. 10-2009-0072310
Sep. 29, 2009 (WO) ............. PCT/KR2009/005557

(51) Int. Cl.
*A63C 19/10* (2006.01)
*F25D 23/12* (2006.01)
*B01F 3/04* (2006.01)

(52) U.S. Cl.
USPC .................. 62/235; 62/260; 62/360

(58) Field of Classification Search
USPC ............ 62/260, 340, 235, 306; 239/2.2, 14.2; 405/217, 61, 160
See application file for complete search history.

(56) References Cited

U.S. PATENT DOCUMENTS

| 4,699,545 A | | 10/1987 | Chen et al. |
| 5,083,707 A | * | 1/1992 | Holden ......................... 239/2.2 |
| 6,164,556 A | * | 12/2000 | Dupre et al. ................. 239/14.2 |
| 2006/0018719 A1 | * | 1/2006 | Stern ............................ 405/217 |
| 2009/0014549 A1 | | 1/2009 | Rosen |

FOREIGN PATENT DOCUMENTS

EP  0 655 591 A1  5/1995
KR  10-829825  5/2008

OTHER PUBLICATIONS

International Search Report in corresponding PCT International Application No. PCT/KR2009/005557 mailed May 14, 2010.
Written Opinion of the International Searching Authority in corresponding PCT International Application No. PCT/KR2009/005557 mailed May 14, 2010.

* cited by examiner

*Primary Examiner* — Cassey D Bauer
(74) *Attorney, Agent, or Firm* — Renner, Otto, Boisselle, & Sklar LLP

(57) ABSTRACT

An apparatus and method for producing and storing ice on the sea using sub-zero cold air of the winter season, to achieve an earlier freezing period, and increasing the area and thickness of the ice layer, to suppress the melting of ice sheets and glaciers and suppress and overcome global warming as well as its side effects. The apparatus and method involve compressing cold air; injecting the compressed cold air into a storage tank; supercooling water using the injected cold air; forming an ice layer by misting the supercooled water into the sea; and increasing a thickness of the ice layer by additionally misting water onto the ice layer formed at water level.

7 Claims, 2 Drawing Sheets

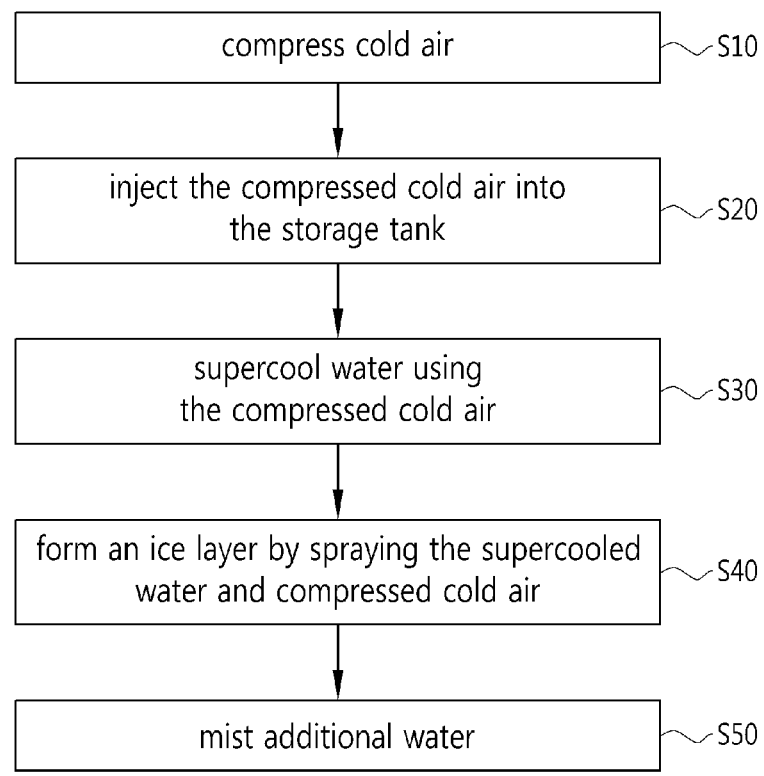

APPARATUS AND METHOD FOR PRODUCING AND STORING MORE ICE OVER OCEAN

TECHNICAL FIELD

The present invention relates to an apparatus and a method for producing and storing more ice over ocean. More particularly, the present invention relates to forming an ice layer using the sub-zero cold air of the winter season, to achieve an earlier freezing, and increasing the area and thickness of the ice layer, to suppress the melting of ice sheets and glaciers and suppress and overcome global warming as well as its side effects.

BACKGROUND ART

Due to the effects of global warming, the ice in polar regions is thawing at a fast rate, and accordingly, the amount of ice sheets and glaciers is decreasing. The melting of glaciers is especially serious over Arctic Ocean in summer, and this is posing a threat to the entire global climate system.

The average albedo of the Earth overall (the percentage of solar energy reflected at the surface) is 31%. The albedo of ice sheets and glaciers, etc., is about 70 to 90%, and the albedo of the oceans is about 8 to 9%. Therefore, as a rise in the Earth's temperature causes the ice sheets and glaciers to melt, the average albedo of the Earth may be decreased accordingly. The seawater, having absorbed more solar energy, may become warmer and may thus accelerate the melting of the glaciers.

At present, all of the first-year ice (ice having a thickness of about 1 m or lower) at the North Pole is thawed in the summer of the same year. In addition, much of the multi-year ice (ice having a thickness of about 1 to 3 m) is also thawed every year. At this rate, it is estimated that all of the ice at the North Pole will disappear by the year 2050. In particular, the rate of melting is observed to be much faster than at first predicted, indicating the seriousness of the problem.

Although it is impossible to know what disasters will be incurred if all of the ice over the Arctic Oceans is melted, it is certain that there will be dire consequences. However, the efforts of the human race in responding to this problem are focused only on reducing carbon emissions, and there are no actions under way for protecting ice sheets and glaciers or for delaying the rate of melting.

Due to its salinity, seawater is not easily frozen. If the salinity is 24.695%, the seawater reaches its maximum density, and at the same time reaches its freezing point, at $-1.33°$ C. If the oceans are assumed to have an average salinity of 35%, the freezing point is known to be $-1.8°$ C., and the temperature at maximum density is known to be $-3.5°$ C.

The temperature at the water level of the Arctic Ocean rarely descends below $-1°$ C., even in the winter. Moreover, the cold seawater cooled by the winter air is increased in density and is thus moved to the bottom of the sea, while the relatively warm seawater from the bottom is moved upward. This phenomenon of convection makes it even more difficult for seawater to form ice.

Much of the ice that covers the North Pole in winter is produced by freshwater flowing in from the continents (from Russia, etc., for example) and freezing before it mixes with seawater, or by snow, etc., forming a layer of ice on the water surface and accumulating on the ice layer. Therefore, ice may be formed earlier in regions of the sea that are close to the continent, compared to regions of the sea that are far from the shore. That is, unless the temperature is very low, or there is a heavy downfall of snow, etc., so that a layer of ice is formed, the snow falling on the sea is absorbed into the sea, and the ice forming on the waters of the offshore sea cannot reach a considerable thickness.

The average temperature at the water level of the Arctic Ocean actually drops below zero degrees in November, and the sub-zero temperature continues into May. The period when the ice is the thickest is in March. However, even when both the water temperature and the air temperature are below zero, there are still regions and periods in which no ice is formed. If a small area of ice were to be formed artificially in such a region, it may be possible to form a layer of ice at an earlier period than under natural circumstances. Then, the period during which the ice layer is formed can be extended, so that a broader and thicker layer of ice may be obtained than under natural circumstances.

This broader and thicker layer of ice may continuously reflect solar energy until its thawing. Moreover, when it is finally thawed in the summer season, the thawing may reduce the temperatures of the surrounding water and air, to delay the melting of nearby ice sheets and glaciers. Until now, there has not been an attempt to artificially form and increase the thickness of a layer of ice in an offshore sea. Of course, a patent on "A METHOD OF ICE KEEPING IN RESERVOIR (Korean registered patent no. 10-829825)" has been filed by the applicant, but the patent relates to a method of producing ice from freshwater and therefore may not easily be applied to seawater.

DISCLOSURE OF INVENTION

Technical Problem

To resolve the problems described above, an aspect of the invention aims to provide an apparatus and a method for producing and storing ice on the sea, where the sub-zero cold air of the winter season is utilized in forming a layer of ice on the sea and increasing the area and thickness of the ice layer. In this way, an aspect of the invention may improve the reflectivity to solar energy, protect ice sheets and glaciers and suppress the rise in water and air temperature, and generally overcome global warming as well as its side effects.

Solution to Problem

To achieve the above objectives, an aspect of the present invention provides an apparatus for producing and storing ice in a sea that includes: a storage tank; a compressor, which compresses cold air and inject the cold air into the storage tank; a first pump, which propels water that is supercooled by the cold air; a first nozzle, which sprays the supercooled water propelled by the first pump; and a screen, prepared on an inside of the first nozzle, for converting the supercooled water into a mist. The apparatus can additionally include a second nozzle, which is connected with the compressor, and which sprays cold air towards the supercooled water that is sprayed through the first nozzle, and can also include a second pump for drawing seawater, connected with the storage tank.

Here, a transport tube that connects the storage tank with the second pump can branch off in the middle, with the branch tube divided from the transport tube connecting directly with the first pump, and a valve installed on the branching point of the transport tube.

Another aspect of the present invention provides a method for producing and storing ice in a sea that includes: compressing cold air; injecting the compressed cold air into a storage tank; supercooling water using the injected cold air; forming an ice layer by misting the supercooled water into the sea; and increasing a thickness of the ice layer by additionally misting water onto the ice layer formed at water level.

Advantageous Effects of Invention

The apparatus and method according to certain aspects of the present invention utilize the sub-zero cold air of the winter season to form a layer of ice on the water surface of the sea, and in this way provides an earlier freezing period. As snow and rain accumulate on the surface of the ice layer and seawater contacts the bottom of the ice layer, the ice layer can be increased in both area and thickness. This layer of ice can preserve ice sheets and glacierthe selongglaceriods of time, reflect m se solar energy into space, and lower the water and air temperatures when thawing. In this way, certain aspects of the present invention can help suppress global warming and the resultant climate changes, and also protect the ecosystem of nearby regions.

BRIEF DESCRIPTION OF DRAWINGS

FIG. 3 is a flowchart illustrating a method for producing and storing ice on the sea according to an embodiment of the present invention.

MODE FOR THE INVENTION

Figure 1:
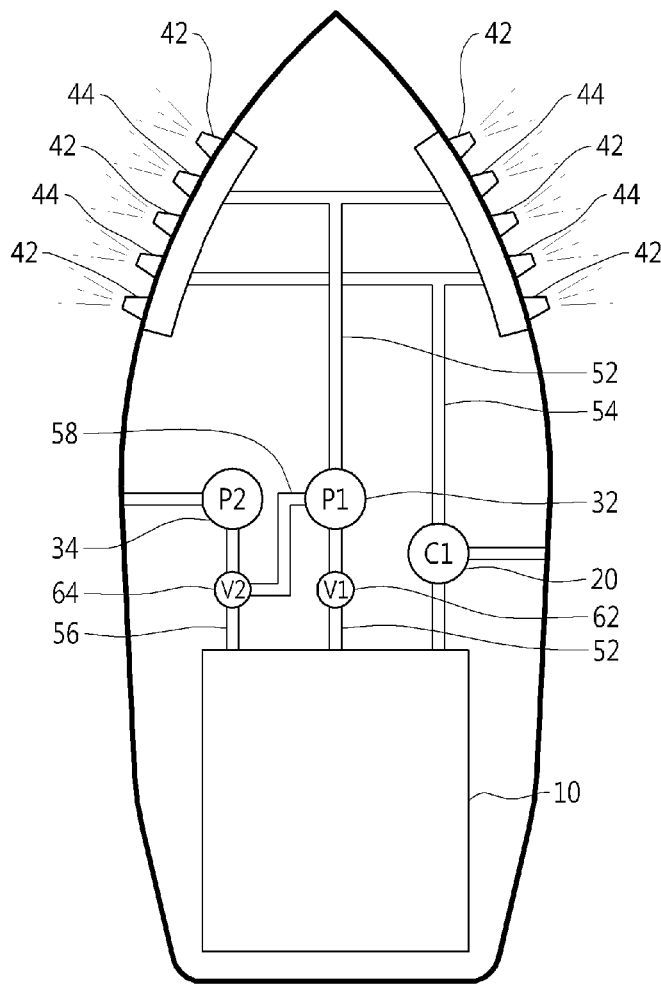
FIG. 1 is a schematic diagram of an apparatus for producing and storing ice on the sea according to an embodiment of the present invention.

Certain embodiments of the present invention will be described below in more detail with reference to the accompanying drawings. In describing the embodiments of the invention, and in rendering reference numerals to the elements represented in the drawings, like numerals refer to like elements throughout, regardless of the figure number.

Figure 2:
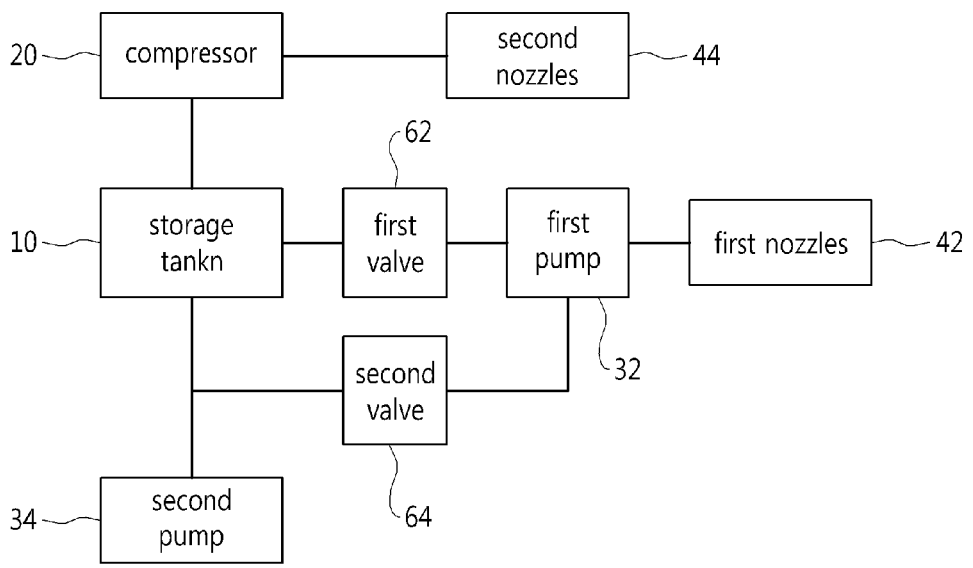
FIG. 2 is a block diagram representing the composition of an apparatus for producing and storing ice on the sea according to an embodiment of the present invention.

FIG. 1 is a schematic diagram of an apparatus for producing and storing ice on the sea according to an embodiment of the present invention, and FIG. 2 is a block diagram representing the composition of an apparatus for producing and storing ice on the sea according to an embodiment of the present invention.

The apparatus for producing and storing ice on the sea according to an embodiment of the present invention may be installed on a ship, so that the ship may move the apparatus to an offshore region, and the apparatus may form a layer of ice in the corresponding region (on the sea). The composition of the apparatus for producing and storing ice on the sea is described in more detail as follows.

As illustrated in FIG. 1 and FIG. 2, the apparatus can include a storage tank 10, a compressor 20 that compresses cold air and injects it into the storage tank 10, a first pump 32 that propels water supercooled by the cold air, first nozzles 42 that spray the supercooled water propelled by the first pump 32 into the sea, second nozzles 44 that spray cold air towards the supercooled water being sprayed through the first nozzles 42, and a second pump 34 for drawing seawater that is connected to the storage tank.

First, the storage tank 10 may be a space for storing water and may be installed inside the ship. The water stored in the storage tank 10 will be used in forming an ice layer on the sea. Thus, the water may be kept in such a state that the water freezes immediately after it is sprayed, i.e. the water may be kept in a supercooled state. For this purpose, the storage tank 10 may preferably be a pressure container that is capable of withstanding certain levels of pressure and temperature. In particular, the water stored in the storage tank 10 may preferably be freshwater, which does not contain salt, in order to facilitate the freezing.

The compressor 20 may serve to draw in and compress the sub-zero air of the winter season. The cold air compressed by the compressor 20 (hereinafter referred to as compressed cold air) may be used to place the water in a supercooled state. That is, by supplying the high-pressure compressed cold air into the storage tank 10 to compress and cool the water, the water can be placed and maintained in a supercooled state.

In addition to supercooling the water, the cold air compressed by the compressor 20 may also be used for improving the freezing efficiency of the water sprayed into the sea. To be more specific, the water in a supercooled state may be sprayed in the form of a mist through the first nozzles 42, which will be described later in more detail. If this spraying operation is accompanied by an additional spraying of the compressed cold air, the compressed cold air may absorb heat from the water and evaporate, so that the water having lost the heat may freeze more easily.

The first pump 32 may serve to selectively propel the water supercooled by the compressed cold air (hereinafter referred to as supercooled water) or the seawater drawn by the second pump 34, which will be described later in more detail. That is, in the initial stages of forming the ice layer, the supercooled water from the storage tank 10 may be propelled to the first nozzles 42, and when the ice layer reaches a particular thickness, the seawater drawn in by the second pump 34 may be propelled to the first nozzles 42. The selective propulsion of the supercooled water and seawater can be implemented by way of a first valve 62 installed on the tubing that connects the first pump 32 with the storage tank 10.

The first and second nozzles 42, 44 may be installed on either side of the front of the ship. The first and second nozzles 42, 44 may be formed alternately in a row along the side on the front of the ship, with the second nozzles 44 positioned in-between the first nozzles 42.

The first nozzles 42 may spray the supercooled water or seawater propelled by the first pump 32. Also, the second nozzles 44 may spray the compressed cold air propelled from the compressor 20. Thus, by positioning the second nozzles 44 alternately in-between the first nozzles 42 as described above, the freezing efficiency can be improved.

In particular, on the inside of the first nozzles 42, a screen (not shown) may be installed, which may serve to convert the supercooled water into a mist form. The screen can be shaped as a closely knit mesh. The supercooled water passing through the screen may be sprayed in the form of a mist, so that the heat-absorbing effects of the compressed cold air may be facilitated, and the freezing efficiency may be improved.

The second pump 34 may serve to draw in seawater and move the seawater to the first pump 32 or the storage tank 10. A transport tube 56 that connects the second pump 34 and the storage tank 10 may branch off in the middle and connect with the first pump 32. That is, the branch tube 58 divided from the transport tube 56 may be connected directly with the first pump 32. Also, on the branching point of the transport tube 56 where the branch tube 58 is divided, a second valve 64 may be installed. Here, the seawater drawn in may be moved selectively by the second valve 64 installed on the branching point towards the first pump 32 or the storage tank 10.

FIG. 3 is a flowchart illustrating a method for producing and storing ice on the sea according to an embodiment of the present invention.

As described above, an apparatus for producing and storing ice on the sea according to an embodiment of the present invention may be installed on a ship, to form a layer of ice in an area (on the sea) after moving to an offshore location. A method of producing and storing ice on the sea using an apparatus according to an embodiment of the present invention will be described below in more detail, with reference to FIG. 1 through FIG. 3.

Before departing to the region where the ice layer is to be formed, the storage tank 10 of the ship may be filled with water. The water filled in the storage tank 10 will be used in forming the ice layer, and in order that the water may readily be supercooled and easily frozen, the water may preferably be pure water that does not contain salt, i.e. freshwater.

When freshwater is filled in the storage tank 10, the sub-zero cold air may be compressed by using the compressor 20 (S10). The method of producing and storing ice on the sea according to an embodiment of the present invention utilizes the sub-zero air of the winter season for producing a layer of ice on the sea and achieving an earlier freezing period than under natural circumstances. Thus, the sub-zero cold air may easily be obtained from the atmosphere.

The sub-zero cold air obtained in this manner may be compressed by the compressor 20, as described above, and supplied to the storage tank 10 (S20). Then, using the compressed cold air thus supplied, the freshwater stored in the storage tank 10 may be supercooled (S30).

Supercooling refers to cooling a liquid to a temperature below its phase-change temperature without having the liquid undergo a phase change. In this embodiment, the cold air compressed by the compressor 20 may be sprayed into the water, to cool the freshwater and form a supercooled state. The pressure of the storage tank 10 can be increased such that the supercooled state may be preserved.

The freshwater supercooled in this manner can be propelled by the first pump 32, to be sprayed through the first nozzles 42 into the sea. The supercooled water may form ice immediately after being sprayed through the first nozzles 42, so that a layer of ice may be formed on the sea (S40).

Here, a screen (not shown) may be installed on the inside of the first nozzles 42. The supercooled water passing through the screen may be converted into a mist as it is discharged, whereby the freezing efficiency may be increased. In particular, the compressed cold air sprayed through the second nozzles 44, which are installed adjacent to the first nozzles 42, may absorb heat from the supercooled water and evaporate, so that the freezing efficiency may be improved even further.

When a layer of ice is formed by the supercooled water and compressed cold air sprayed through the first and second nozzles 42, 44, the first valve 62 may be closed, while the second valve 64 may be opened towards the first pump 32, so as to spray seawater.

This seawater is for increasing the thickness of the ice layer. Since the seawater sprayed onto the ice layer is not subjected to convention but is subjected to cold air, it may easily form ice even though it is not freshwater. As already discussed above, seawater having a salinity of 35% has a freezing point of about −1.8° C., but even in the Arctic Ocean, the temperature at the water surface rarely drops below −1.0° C. Thus, seawater sprayed onto the ice layer may not readily freeze. However, if it is sprayed through the first nozzles 42 in the form of a mist, the tiny particles of seawater may be more affected by the cold winter air and hence may form ice. Also, the small particles of seawater may easily evaporate, and due to the latent heat created during this process, the seawater may form ice more easily.

Instead of spraying the seawater drawn by the second pump 34 directly onto the ice, the freezing efficiency can be improved further by having the seawater stored in the storage tank 10 and spraying the seawater after compressing and cooling the seawater using the compressed cold air supplied from the compressor 20.

By utilizing the apparatus and method for producing and storing ice on the sea according to certain aspects of the present invention as set forth above, a layer of ice may be formed on the sea by supercooling freshwater using the sub-zero cold air of the winter season and spraying the supercooled water. This can move freezing period forward compared to natural circumstances, and the layer of ice formed in an earlier period may become considerably thicker during the winter, so that the ice layer may not easily melt even in the following summer.

Preserving the ice layer in this manner for a longer period of time can increase the average albedo of the Earth, to lower the average temperature. Therefore, the melting of ice sheets and glaciers can be reduced, and the rate of melting can be delayed, making it possible to suppress global warming and its side effects and protect the ecosystem of the surrounding regions.

While the present invention has been described with reference to particular embodiments, the embodiments are merely for illustrating the spirit of the invention. Those skilled in the art will understand that numerous variations can be conceived without departing from the scope and spirit of the invention. Therefore, the scope of the invention is to be defined by the appended claims rather than by the foregoing description. All variations coming within the meaning and range of equivalency of the claims are embraced within their scope.

The invention claimed is:

1. An apparatus for producing and storing ice in a sea, the apparatus comprising:
    a storage tank;
    a compressor configured to compress cold air and inject the cold air into the storage tank;
    a first pump configured to propel water supercooled by the cold air;
    a first nozzle configured to spray the supercooled water propelled by the first pump and to convert the supercooled water into a mist; and
    a second pump for drawing seawater, the second pump connected with the storage tank.

2. The apparatus of claim 1, further comprising:
    a second nozzle connected with the compressor, the second nozzle configured to spray cold air towards the supercooled water sprayed through the first nozzle.

3. The apparatus of claim 1, wherein a transport tube connecting the storage tank with the second pump branches off in a middle portion, the branch tube divided from the transport tube connects directly with the first pump, and a valve is installed on the branching point of the transport tube.

4. A method for producing and storing ice in a sea, the method comprising:
    compressing cold air using a compressor;
    injecting the compressed cold air into a storage tank;
    drawing in water using a first pump connected with the storage tank;
    supercooling the water using the injected cold air;
    propelling the supercooled water to a second nozzle using a first pump;
    forming an ice layer by misting the supercooled water into the sea using the first nozzle; and
    increasing a thickness of the ice layer by additionally misting water onto the ice layer formed at water level.

5. The method of claim 4, wherein forming the ice layer comprises spraying the supercooled water and cold air together.

6. The method of claim 5, wherein the water for producing the ice layer includes seawater.

7. The method of claim 4, wherein the first pump is configured to draw in water and propel the water to the first pump or to the storage tank.

* * * * *